(12) United States Patent
Hausdorf et al.

(10) Patent No.: US 6,343,697 B1
(45) Date of Patent: Feb. 5, 2002

(54) FILTER DEVICE WITH FILTER DISKS

(75) Inventors: Jurgen Hausdorf, Saarbrucken; Norbert Lang, Blieskastel; Heinrich Teckentrup, Saarbrucken, all of (DE)

(73) Assignee: Hydac Process Technology GmbH, Neunkirchen (DE)

( * ) Notice: Subject to any disclaimer, the term of this patent is extended or adjusted under 35 U.S.C. 154(b) by 0 days.

(21) Appl. No.: 09/402,268

(22) PCT Filed: Oct. 30, 1997

(86) PCT No.: PCT/EP97/06007

§ 371 Date: Oct. 1, 1999

§ 102(e) Date: Oct. 1, 1999

(87) PCT Pub. No.: WO98/45022

PCT Pub. Date: Oct. 15, 1998

(30) Foreign Application Priority Data

Apr. 7, 1997 (DE) ......................................... 197 14 187

(51) Int. Cl.$^7$ ............................................... B01D 29/39
(52) U.S. Cl. ...................... 210/486; 210/227; 210/228; 210/231; 210/346; 210/488; 210/498
(58) Field of Search ................................. 210/488, 498, 210/224, 227, 228, 230, 231, 346, 486, 483, 321, 84; 425/197, 199

(56) References Cited

U.S. PATENT DOCUMENTS

| 806,491 A | * | 12/1905 | Pick | |
|---|---|---|---|---|
| 808,043 A | * | 12/1905 | Gray | |
| 2,084,753 A | * | 6/1937 | Watson et al. | |
| 2,989,187 A | * | 6/1961 | Demeter | |
| 3,152,988 A | * | 10/1964 | Gutkowski et al. | |
| 3,481,479 A | * | 12/1969 | Hoskins et al. | |
| 3,702,659 A | * | 11/1972 | Clark | |
| 4,683,060 A | * | 7/1987 | Drori | 210/448 |
| 4,876,007 A | * | 10/1989 | Naruo et al. | 210/339 |
| 4,902,420 A | | 2/1990 | Pall et al. | |
| 5,362,387 A | * | 11/1994 | Saito et al. | 210/225 |
| 5,611,925 A | * | 3/1997 | Yasue et al. | 210/346 |
| 5,788,860 A | * | 8/1998 | Yasue et al. | 210/346 |

FOREIGN PATENT DOCUMENTS

| DE | 1096331 | 6/1961 |
|---|---|---|
| DE | 4427849 A1 | 2/1996 |
| EP | 0655268 A2 | 3/1995 |

OTHER PUBLICATIONS

Hawley's Condensed Chemical Dictionary (Lewis, Richard, $13^{th}$ ed. pp. 1047–1048).*

* cited by examiner

Primary Examiner—Matthew O. Savage
Assistant Examiner—Marianne Ocampo
(74) Attorney, Agent, or Firm—Roylance, Abrams, Berdo & Goodman, L.L.P.

(57) ABSTRACT

A filter device, particularly for filtering melt-type fluids, such as polymer melts, includes at least one filter disk having two filter disk halves connected to each other by their edges and provided with filter material on their exterior surfaces. The filter disk halves are held apart by a supporting device delimiting a substantially free hollow area between them, through which a fluid can flow freely. Inwardly, they delimit an outflow opening for the melt-type filtered fluid. The supporting device has individual supporting cams of substantially equal outer dimensions and arranged in several groups. Separated from each other, the supporting cams extend radially outwardly form the outflow opening, are rigidly connected to at least one of the two halves, and traverse the hollow area in such a way as to rest against the other filter disk half. This results in a filter device which is economical to produce and which has enhanced filter performance when in operation. It is suited particularly to filtering melt-type liquids, such as polymer melts, under high pressure.

41 Claims, 4 Drawing Sheets

FILTER DEVICE WITH FILTER DISKS

FIELD OF THE INVENTION

The present invention relates to a filter device, especially for filtering melt-like fluids, such as polymer melts, having at least one filter disk made up of two filter disk halves. The filter disk halves are connected with one another along one edge and are fitted with a fabric or cloth fabric filter material aligned on the exterior. The disk halves are held at some distance from one another by a support arrangement to define a hollow space between them having an essentially open flow-through passage. In the interior, an outlet opening is provided for the melt-like fluid.

BACKGROUND OF THE INVENTION

U.S. Pat. No. 4,902,420 discloses a filter arrangement with a multi-layer construction. Between the fabric or cloth fabric filter materials lying facing one another a drainage plate is inserted as support device Longitudinal slots extend from the exterior to the interior to define a hollow space of small volume between the fabric or cloth fabric filter materials. The medium to be filtered, for example a polymer melt, in this system is subjected to increased flow resistance, so that the filter capacity is correspondingly decreased. Because of the complicated construction and the multiplicity of parts, the manufacturing costs are higher. Furthermore, the separation of the fluid streams in the filter disk occurring by the separation into various longitudinal slots causes the so-called memory effect. If, for instance, there is subsequent formation of blowholes or such phenomena out of the polymer melts, this leads to undesired formations of strips or lamina.

DE-AS 1,096,331 discloses a filter device having at least one filter disk formed of two filter disk halves connected with one another. Between them, the filter disk halves limit an essentially open passage, allowing flow-through in the hollow space. A fabric or cloth fabric filter material is aligned on the disk halves exterior. The filter disk half has a metal disk with discharge openings or is constructed of spoke-like fillets. Coiled ribs or fins or fillets are used as a support arrangement, and extend radially inward and at some distance from one another over the entire hollow space, which tapers conically outward to the exterior periphery. Insufficient support is provided for the filter disk halves with their fabric or cloth filter material, so that this filter arrangement can be used only in a limited manner. Especially when high pressures are present, it cannot be used without danger of breakdown. Additionally, the ribs or fins used in this filter arrangement separate the hollow space which is preferably open to flow-through into individual chambers. Here too, the flow resistance is increased, so that this filter arrangement does not suffice for the filtering of melt-like fluids.

SUMMARY OF THE INVENTION

Objects of the present invention are to provide improved filter arrangements which can be manufactured at low cost and which allow an increased filtering capacity during operation. Especially for the filtering of melt-like fluids, such as polymer melts, it can be designed for use under high pressures.

The support arrangement includes individual supporting cams with essentially identical exterior dimensions. The cams extend outwardly from the discharge opening, are arranged in a plurality of groups, are separated from one another radially, are securely connected with at least one of the two filter disk halves and pass through the hollow space. In this manner, each filter disk half is in contact with the other filter disk half, and the entire hollow space is available as an essentially open flow-through passage. The above-described drainage plates can then be deleted to save cost. Consequently, the flow volume of the melt-like fluid to be filtered, such as polymer melts, and consequently also the filtering capacity, are increased.

As a result of having the plurality of supporting cams arranged in groups, extending between the two filter disk halves of a filter disk and supporting this disk assembly, a high resistance to pressure stresses on the filter disk halves as well as on their fabric or cloth fabric filter materials is attained. Overall, a highly pressure-stable filter disk is realized for use in the filter device. Simultaneously, the offset arrangement of the supporting cams causes mixing of the melt flow, which thus counters the memory-effect.

With one preferred embodiment of the filter device according to the present invention, the individual group arrangements of supporting cams are arranged at different radial distances from the outlet opening and are aligned along concentric circles around this outlet opening. Such an arrangement allows a high degree of support for the filter disk halves. Accordingly, such arrangement has only a slightly negative influence on the dimensions of the opening of the, hollow space for flow-through between the filter disk halves in the sense of causing only a slight increase of flow resistance. Also, a favorable means of manufacturing the filter disk, and consequently the entire filter device, can be attained in this manner.

In another preferred embodiment of the filter device according to the present invention, the two filter disk halves of a filter disk are provided with supporting cams of identical dimensions on the adjacent and facing sides. Such sides either engage along a longitudinal separation line of the filter disk halves where they abut one another, and/or, wit contact with the relevant other filter disk half, they engage in the free spaces between the supporting cams of each relevant facing filter disk half. With such described arrangements, to save on outlay, the filter disk can be composed of identically constructed filter disk halves.

The outlay for the manufacture can be further decreased, insofar as the supporting cams are connected tightly with the relevant filter disk halves, by means of weld points produced by a projection-weld method.

With another preferred embodiment of the filter device according to the present invention, the two filter disk halves extend parallel to one another and define a disk-shaped hollow space of identical dimensions. A favorable flow-through of the melt-like fluid is attained in this manner, without increasing the wall shearing or thrust stresses when it comes to the flow resistance with the flow of the melt though the filter disk.

With one especially preferred embodiment of the filter device according to the present invention, the supporting cams form fillet-like solid box profiles. Such cams, in turn, can be mounted on the filter disk halves in such a manner that they free the discharge openings in the filter disk halves. As a result of the use of the solid box section profiles, the fabric or cloth fabric filter materials on the outside of the two filter disk halves of a filter disk can be securely supported and are not drawn into the box section profile of the supporting cams. For example, the filter materials could be drawn into the box section profile, if the supporting cams would be shaped out of the filter disk halves by a deepdrawing method or the like. Since the box section profiles are embodied as fillet-like, they can be used beneficially in the intermediate spaces between the openings of a filter disk half. They then do not have the capacity to negatively influence the open flow-through through these discharge openings. The arrangement can especially avoid the generation of flow shadows, since the discharge openings are grouped without any side spacing directly around the supporting cams and are left free.

With another especially preferred embodiment of the filter device according to the present invention, the discharge openings are formed in the filter disk halves by means of circular cutouts. In groups of different magnitudes, the circular cutouts extend along concentric circles around the outlet opening. By a certain selection of the grouping with discharge openings in the form of rows of holes, the flow ratios within the filter disk can improve for the melt-like fluid, and thus, the filter capacity can be increased. Preferably the filter disk halves and the supporting cams are formed of top-grade steel, so that these are not inclined to corrode, and consequently, cannot pollute the melt-like fluid. Insofar as spacing cams are arranged on the top and bottom of the filter disk, especially in the peripheral side border areas where the filter disk halves are connected with one another by a border welding joint, then in a cost-saving manner the traditional so-called spacer can be deleted. The known filter device would then serve to hold the filter disks inside the assembly at some spacing from one another Such a spacing is now realized by means of the spacing cams arranged directly on the filter disks.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
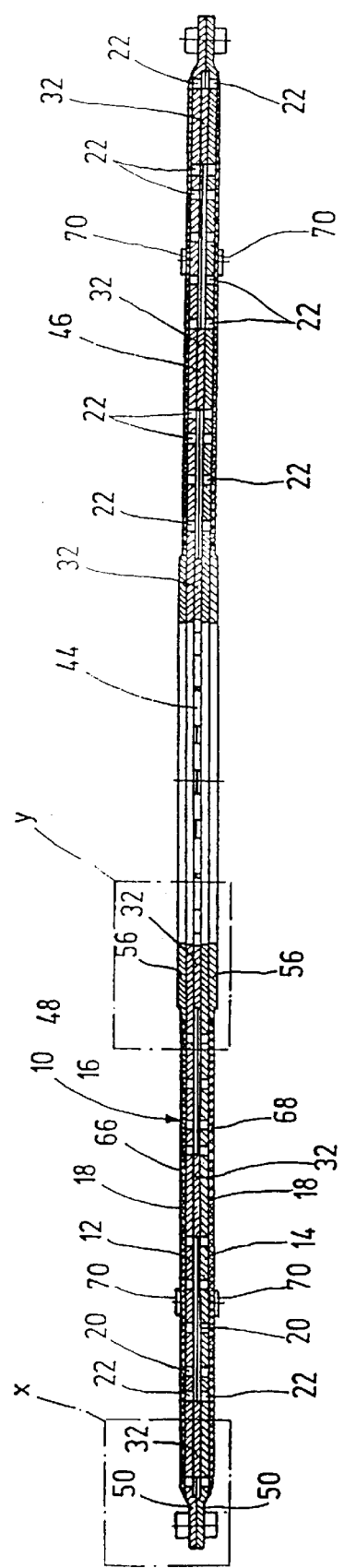
FIG. 1 is a side elevational view in section of a filter disk according to an embodiment of the present invention.

A filter disk 10 is shown in longitudinal section in FIG. 1. Filter disk 10 comprises two filter disk halves 12 and 14 connected with one another and limiting between them a cylindrical, disk-like hollow space 16 of identical dimensions having an essentially open flow-through passage. Each filter disk half is provided with a fabric or cloth fabric filter material 18 of predetermined mesh or pore dimensions and aligned on the exterior.

Figure 2:
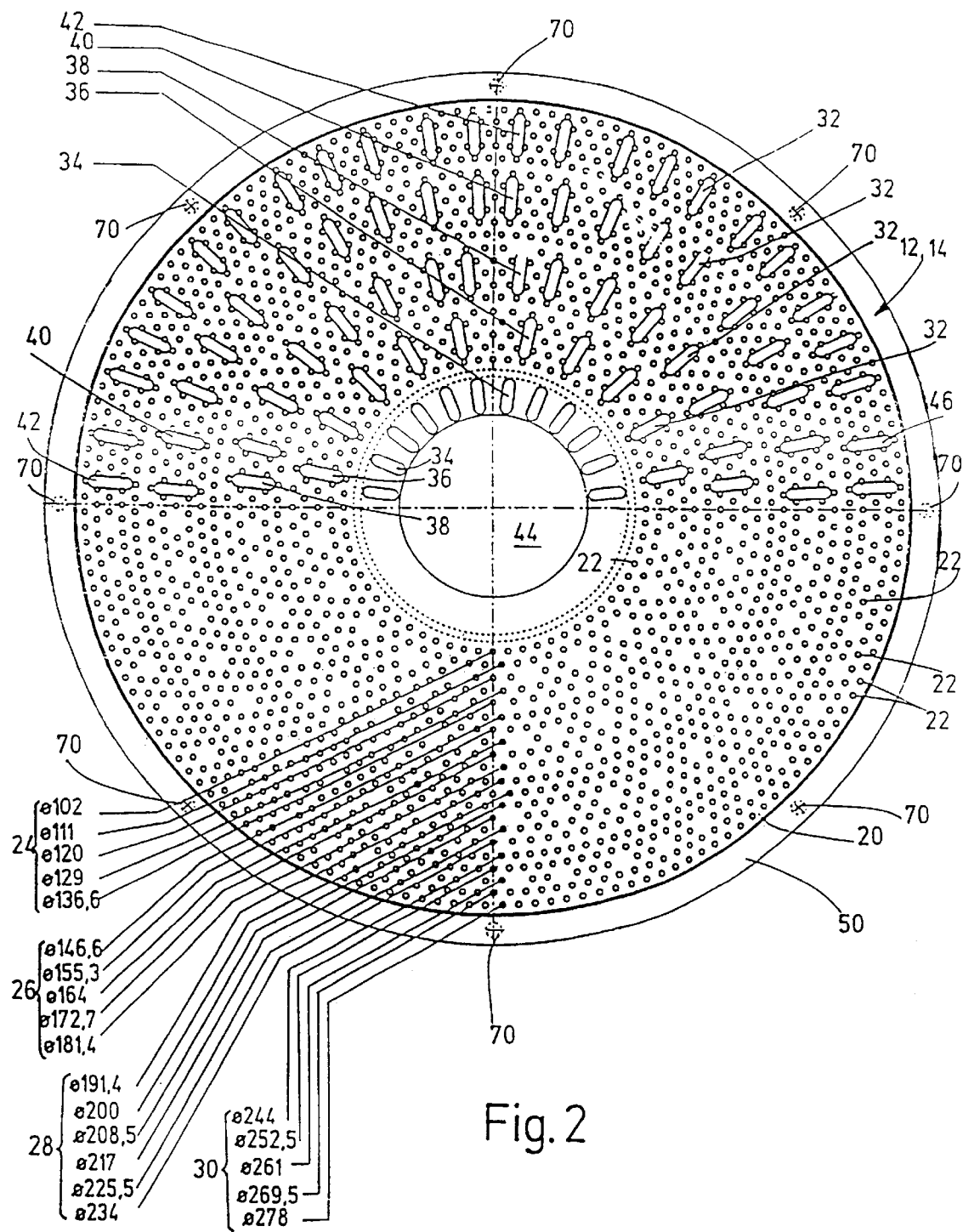
FIG. 2 is a top plan view of a filter disk half, formed of a metal disk with discharge openings, of FIG. 1.
Figure 3:
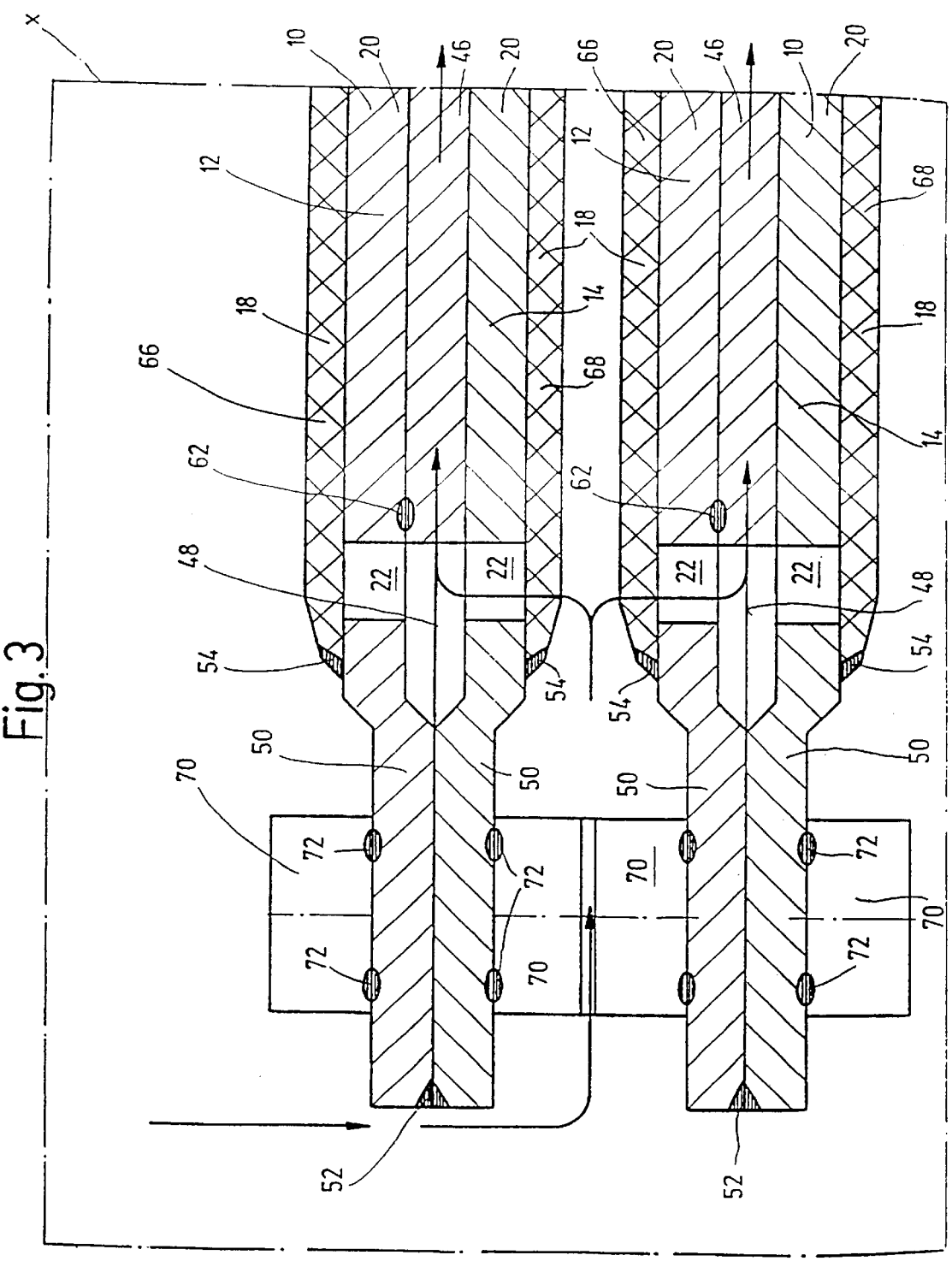
FIG. 3 is an enlarged, side elevational view in section of the filter disk in area X of FIG. 1.

As shown particularly in FIG. 2, filter disk haves 12 and 14 are each formed of a metal disk 20 with discharge openings, of identical construction, preferably of top-grade steel. The metal disk 20 has a plurality of discharge openings 22, through which can flow the melt-like fluid, especially the polymer melts. Discharge openings 22 are preferably in the form of circular openings and are formed on the metal disk 20 by using different cross sectional widths of openings as shown in FIG. 3. The openings are arranged to form individual radial groups 24, 26, 28 and 30. The individual groups 24, 26, 28, 30 of discharge openings 22 incorporate different frequency arrangements of discharge openings 22, and are oriented along concentric circles around the vertically oriented longitudinal midline of filter disk 10. Thus, the innermost group 24 has discharge openings 22 on five concentric circles aligned one behind the other. Likewise, the following group 26 has discharge openings 22, the group 38 having discharge openings 22, and finally the group 30 having discharge openings 22.

In some detail, the interior of metal disk 20, with discharge openings as shown in FIG. 2, has projecting ribs or fins or web-like fillets or fillet-like, solid box section profiles forming supporting cams 32. The cams extend along concentric circles aligned outward and formed into groups 34, 36, 38, 40, 42. In some detail, filter disk halves 12, 14 in the form of the metal disk 20 with discharge openings in the interior defines a circular outlet opening or chamber 44. The cited supporting cams are parts of a supporting arrangement 46 which holds the filter disk halves 12, 14 at a certain, defined distance from one another and pressure-stable. Outlet opening 44 in turn represents a circular outlet opening, through which the melt-like filtered fluid is discharged from the filter device.

The two filter disk halves 12 and 14 of filter disk 10 are provided with supporting cams 32 of identical height and identical dimensions on their sides facing one another. Supporting cams 32 can be arranged, in at embodiment not shown in greater detail, along the longitudinal separation line 48 of FIG. 1, or, as shown in FIGS. 1 and 2, on different plate halves, whereby supporting cams 32 extend into the open hollow space following the superpositioning of the filter disk halves 12 and 14. The hollow space in turn is limited by the other filter disk half, either 14 or 12, only in laminar configuration. With a different and not shown embodiment, the distribution of supporting cams 32 can be arranged appropriately for the filter disk halves 12 and 14 in such a manner that they engage alternating according to a predeterminable pattern in the intermediate spaces produced between supporting cams 32 of the other filter disk half, either 14 or 12. An especially low-cost method of manufacture, however, is when the supporting cam arrangement 32 is arranged as is illustrated for the two filter disk halves 12 and 14 in FIG. 2. The filter disk halves 12, 14, being identical with one another, need only be pivoted around the longitudinal midline or separation line 48 of filter disk 10 and be superimposed one on the other, in order to obtain the disk assembly as in FIG. 1. At this point let it also be repeated that the filter disk 10 is to be referred to in technical terminology as 'disk' or 'filter disk'.

Figure 4:
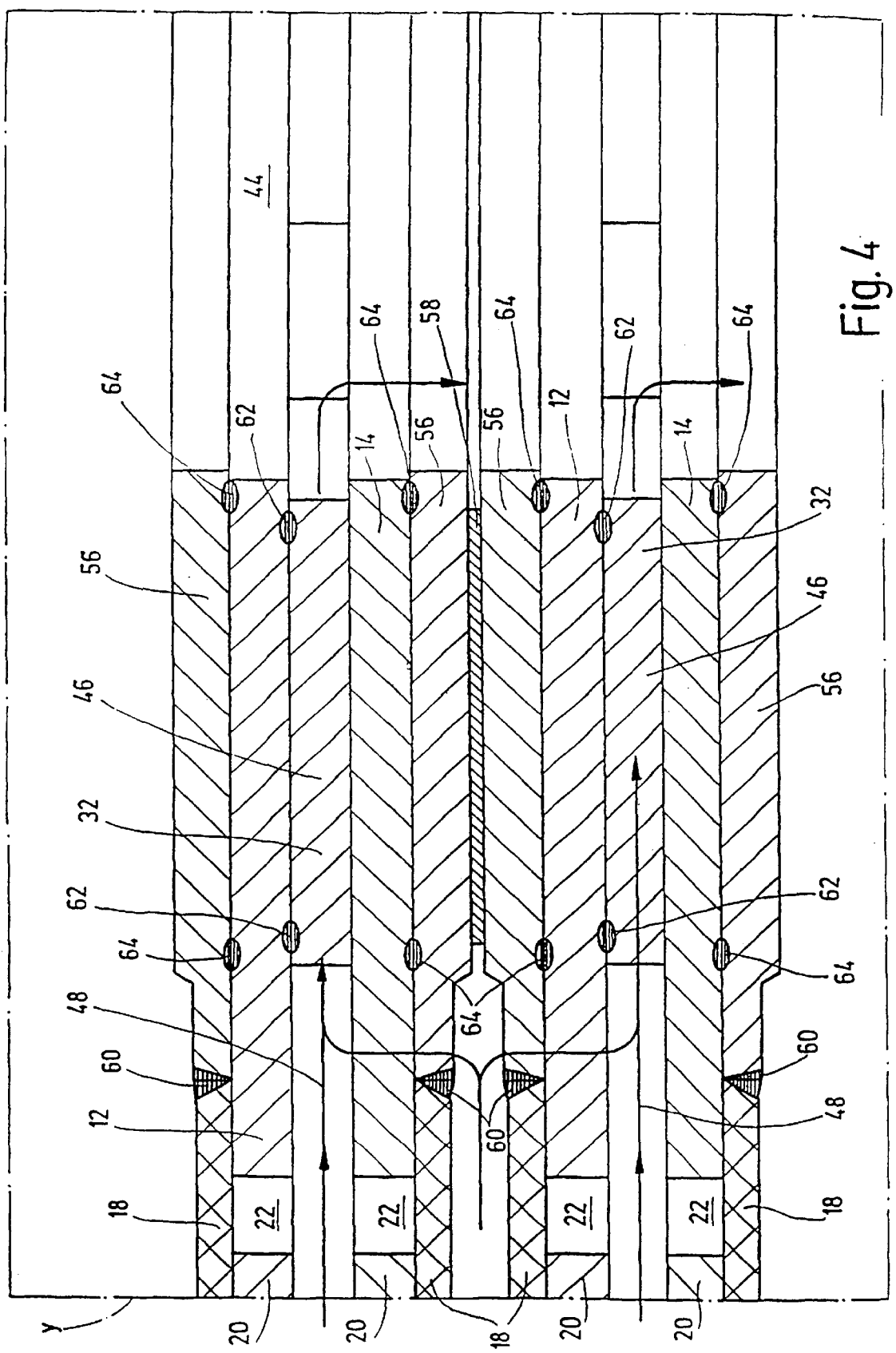
FIG. 4 is an enlarged side elevational view in section of the filter disk in area Y of FIG. 1.

As is shown further in FIGS. 1 and 3, the metal disk 20 incorporating discharge openings opens to the exterior through a supporting ring 50. Ring 50 is offset from the longitudinal midline of metal disk 20 and terminates on the longitudinal midline 48 of filter disk 10. As is shown particularly by the enlarged depiction of FIG. 3, the adjacent, facing supporting rings 50 of a filter disk 10 are superposed one over the other and are connected tightly with one another around the exterior periphery by leans of a circumferential welding joint 52. Likewise, by means of an annular welding joint 54, the fabric or cloth fabric filter material disks 18 are connected tightly on the exterior periphery with the exterior peripheral edge of metal disk 20 having discharge openings. Possible fluid flow directions are shown in FIGS. 3 and 4 with arrows. The melt-like medium or fluid to be filtered, especially in the form of polymer melts, comes under high pressure (above 100 bar) from the outside inward through the fabric or cloth fabric material 18 and is conducted through discharge openings 22 in metal disk 20 into open hollow space 16 defined therein. Since no flow resistance in hollow space 16 is provided before reaching supporting cams 32, the overall flow resistance is considerably diminished, and the flow velocity of the medium through the filter device and consequently also the filtration capacity are commensurately increased.

The sectional enlargement of area, indicated with "Y" from FIG. 1 and shown in FIG. 4, shows the possible flow direction of filter disk 10 to outlet opening 44 with arrows. The relevant discharge chamber or the relevant outlet opening 44 in the interior of each filter disk 10 is limited by an interior supporting ring 56 on each filter disk half 12 and 14. The disk thickness in this area is maintained essentially identical. The interior supporting rings 56 of each filter disk 10 are opposite and adjacent to one another and are held at a predetermined distance from one another by means of a spacing disk or washer 58, especially in the form of a type of flow gasket The fabric or cloth fabric material 18 is then tightly connected by means of an interior welding joint 60 with the associated interior supporting ring 56. The outward-projecting part of supporting ring 56 forms a contact surface for the interior edge of the fabric or cloth fabric filter material 18 to be supported.

The individual supporting cams 32 are tightly connected with the relevant filter disk halves 12 and/or 14 by welding points 62 produced by means of a projection weld method. By means of other welding points 64 produced by a projection weld method, the interior of metal disk 20 facing and adjacent to outlet opening 44 is tightly welded with the already cited interior supporting rings 56. On the top 66 and bottom 68 of each filter disk 10, spacing cams 70 are then arranged in uniform, radial spacings around the exterior periphery spaced from one another on filter disk 10. Spacing cams 70 are mounted securely by means of projection weld points 72 and the function as a spacer for individual filter disks 10. Such spacing cams 70, as also shown in FIG. 1, could be distributed over the filter disk top surface, or especially could be arranged in the middle area.

A plurality of filter disks 10 arranged one over the other then provide the complete filter device arranged in a housing, not shown completely. With the relevant filter disk 10, a considerably lower pressure is required for overcoming interior resistance. Additionally, the manufacturing costs are considerably lowered by the simplified construction. Since the individual supporting cams 32 are terminated at their open ends in a circular sealing off, the flow behavior for the melt-like fluid which is to be filtered is improve& Furthermore, since the relevant supporting cam 32 is limited by each group of six circular discharge openings 22, the discharge openings 22 are not covered and are completely accessible for input of the medium.

While various embodiments have been chosen to illustrate the invention, it will be understood by those skilled in the at that various changes and modifications can be made therein without departing from the scope of the invention as defined in the appended claims.

What is claimed is:

1. A filter device for filtering melt-like fluids, comprising:
   at least one filter disk including first and second filter disk halves connected along one edge of each and having discharge openings therein;
   a fabric filter material on an exterior of each of said filter disk halves;
   an outlet opening for the filtered fluid at interior limits of said filter disk halves; and
   a support arrangement holding said filter disk halves at a distance from one
   another to define a hollow space therebetween having an essentially open flow through passage, said support arrangement including individual supporting cams with essentially identical exterior dimensions, said supporting cams being arranged in a plurality of groups and separated from one another, extending radially outwardly from said outlet opening, being fixedly connected with at least one of said filter disk halves and passing through said hollow space to contact the other of said filter disk halves, said supporting cams being formed as solid box section profiles offset on one of said filter disk halves to free said discharge openings, said supporting cams having identical dimensions and being provided on sides of said filter disk halves facing one another, said supporting cams on one of said filter disk halves abutting said supporting cams on the other of said filter disks along a longitudinal separation line between said filter disk halves.

2. A filter device according to claim 1 wherein
each of said groups of said supporting cams are located at different radial distances from said outlet opening, with said supporting cams of each of said groups located on a circle centered on said outlet opening.

3. A filter device according to claim 1 wherein
said first and second filter disk halves with said supporting cams thereon are identical.

4. A filter device according to claim 1 wherein
said supporting cams are fixedly connected to the respective filter disk halves by welding points produced by a projection weld method.

5. A filter device according to claim 1 wherein
said filter disk halves extend parallel to one another and define said hollow space therebetween of identical dimensions.

6. A filter device according to claim 1 wherein
said discharge openings comprise circular cutouts arranged in groups of different magnitudes of frequency and along circles concentric with said outlet opening.

7. A filter device according to claim 1 wherein
said filter disk halves and said supporting cams are formed of top-grade steel.

8. A filter device according to claim 1 wherein
said first and second filter disk halves comprise spacing cams extending in opposite directions from exterior surfaces of said filter disk halves adjacent a periphery thereof where said filter disk halves are connected by a circumferential welding joint.

9. A filter device according to claim 1 wherein
said first and second filter disk halves are essentially identical; and
each of said first and second disk halves has supporting cams on only one side of an interior surface thereof.

10. A filter device according to claim 1 wherein
said supporting cams are fillet-shaped.

11. A filter device according to claim 1 wherein
said supporting cams are narrow members with longer dimensions thereof in radial directions of said disk halves.

12. A filter device for filtering melt-like fluids, comprising:
   at least one filter disk including first and second filter disk halves connected along one edge of each and having discharge openings therein;
   a fabric filter material on an exterior of each of said filter disk halves;
   an outlet opening for the filtered fluid at interior limits of said filter disk halves; and
   a support arrangement holding said filter disk halves at a distance from one another to define a hollow space therebetween having an essentially open flow through passage, said support arrangement including individual supporting cams with essentially identical exterior dimensions, said supporting cams being arranged in a plurality of groups and separated from one another, extending radially outwardly from said outlet opening, being fixedly connected with at least one of said filter disk halves and passing through said hollow space to contact the other of said filter disk halves, said supporting cams being formed as solid box section profiles offset on one of said filter disk halves to free said discharge openings, said supporting cams on each of said filter disk halves contacting the other of said filter disk halves in free spaces between said supporting cams on said other of said filter disk halves.

13. A filter device according to claim 12 wherein
   each of said groups of said supporting cams are located at different radial distances from said outlet opening, with said supporting cams of each of said groups located on a circle centered on said outlet opening.

14. A filter device according to claim 12 wherein
   said first and second filter disk halves with said supporting cams thereon are identical.

15. A filter device according to claim 12 wherein
   said supporting cams are fixedly connected to the respective filter disk halves by welding points produced by a projection weld method.

16. A filter device according to claim 12 wherein
   said filter disk halves extend parallel to one another and define said hollow space therebetween of identical dimensions.

17. A filter device according to claim 12 wherein
   said discharge openings comprise circular cutouts arranged in groups of different magnitudes of frequency and along circles concentric with said outlet opening.

18. A filter device according to claim 12 wherein
   said filter disk halves and said supporting cams are formed of top-grade steel.

19. A filter device according to claim 12 wherein
   said first and second filter disk halves comprise spacing cams extending in opposite directions from exterior surfaces of said filter disk halves adjacent a periphery thereof where said filter disk halves are connected by a circumferential welding joint.

20. A filter device according to claim 12 wherein
   said first and second filter disk halves are essentially identical; and
   each of said first and second disk halves has supporting cams on only one side of an interior surface thereof.

21. A filter device according to claim 12 wherein
   said supporting cams are fillet-shaped.

22. A filter device according to claim 12 wherein
   said supporting cams are narrow members with longer dimensions thereof in radial directions of said disk halves.

23. A filter device for filtering melt-like fluids, comprising:
   at least one filter disk including first and second filter disk halves connected along one edge of each and having discharge openings therein;
   a fabric filter material on an exterior of each of said filter disk halves;
   an outlet opening for the filtered fluid at interior limits of said filter disk halves; and
   a support arrangement holding said filter disk halves at a distance from one another to define a hollow space therebetween having an essentially open flow through passage, said support arrangement including individual supporting cams with essentially identical exterior dimensions, said supporting cams being arranged in a plurality of groups and separated from one another, extending radially outwardly from said outlet opening, being fixedly connected with said filter disk halves and passing through said hollow space to contact the other of said filter disk halves, said supporting cams being formed as solid box section profiles offset on both filter disk halves to free said discharge openings, said first and second filter disk halves with said supporting cams thereon being identical.

24. A filter device according to claim 23 wherein
   each of said groups of said supporting cams are located at different radial distances from said outlet opening, with said supporting cams of each of said groups located on a circle centered on said outlet opening.

25. A filter device according to claim 23 wherein
   said supporting cams are fixedly connected to the respective filter disk halves by welding points produced by a projection weld method.

26. A filter device according to claim 23 wherein
   said filter disk halves extend parallel to one another and define said hollow space therebetween of identical dimensions.

27. A filter device according to claim 23 wherein
   said discharge openings comprise circular cutouts arranged in groups of different magnitudes of frequency and along circles concentric with said outlet opening.

28. A filter device according to claim 23 wherein
   said filter disk halves and said supporting cams are formed of top-grade steel.

29. A filter device according to claim 23 wherein
   said first and second filter disk halves comprise spacing cams extending in opposite directions from exterior surfaces of said filter disk halves adjacent a periphery thereof where said filter disk halves are connected by a circumferential welding joint.

30. A filter device according to claim 23 wherein
   each of said first and second disk halves has supporting cams on only one side of an interior surface thereof.

31. A filter device according to claim 23 wherein
   said supporting cams are fillet-shaped.

32. A filter device according to claim 23 wherein
   said supporting cams are narrow members with longer dimensions thereof in radial directions of said disk halves.

33. A filter device for filtering melt-like fluids, comprising:
   at least one filter disk including essentially identical first and second filter disk halves connected along one edge of each and having discharge openings therein;

a fabric filter material on an exterior of each of said filter disk halves;

an outlet opening for the filtered fluid at interior limits of said filter disk halves; and a support arrangement holding said filter disk halves at a distance from one another to define a hollow space therebetween having an essentially open flow through passage, said support arrangement including individual supporting cams with essentially identical exterior dimensions, said supporting cams being arranged in a plurality of groups and separated from one another, extending radially outwardly from said outlet opening, being fixedly connected with at least one of said filter disk halves and passing through said hollow space to contact the other of said filter disk halves, said supporting cams being formed as solid box section profiles offset on one of said filter disk halves to free said discharge openings, each of said first and second disk halves having supporting cams on only one side of an interior surface thereof.

34. A filter device according to claim 33 wherein each of said groups of said supporting cams are located at different radial distances from said outlet opening, with said supporting cams of each of said groups located on a circle centered on said outlet opening.

35. A filter device according to claim 33 wherein said supporting cams are fixedly connected to the respective filter disk halves by welding points produced by a projection weld method.

36. A filter device according to claim 33 wherein said filter disk halves extend parallel to one another and define said hollow space therebetween of identical dimensions.

37. A filter device according to claim 33 wherein said discharge openings comprise circular cutouts arranged in groups of different magnitudes of frequency and along circles concentric with said outlet opening.

38. A filter device according to claim 33 wherein said filter disk halves and said supporting cams are formed of top-grade steel.

39. A filter device according to claim 33 wherein said first and second filter disk halves comprise spacing cams extending in opposite directions from exterior surfaces of said filter disk halves adjacent a periphery thereof where said filter disk halves are connected by a circumferential welding joint.

40. A filter device according to claim 23 wherein said supporting cams are fillet-shaped.

41. A filter device according to claim 33 wherein said supporting cams are narrow members with longer dimensions thereof in radial directions of said disk halves.

* * * * *